(12) United States Patent
Fahn

(10) Patent No.: US 8,581,838 B2
(45) Date of Patent: Nov. 12, 2013

(54) EYE GAZE CONTROL DURING AVATAR-BASED COMMUNICATION

(75) Inventor: Paul Fahn, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 929 days.

(21) Appl. No.: 12/340,258

(22) Filed: Dec. 19, 2008

(65) Prior Publication Data

US 2010/0156781 A1 Jun. 24, 2010

(51) Int. Cl.
*G09G 5/00* (2006.01)
*H04N 7/14* (2006.01)

(52) U.S. Cl.
USPC .......................................... 345/156; 348/14.16

(58) Field of Classification Search
None
See application file for complete search history.

(56) References Cited

U.S. PATENT DOCUMENTS

| | | | |
|---|---|---|---|
| 6,943,799 B2 * | 9/2005 | Vorst | 345/539 |
| 7,006,098 B2 | 2/2006 | Bickmore et al. | |
| 8,032,842 B2 * | 10/2011 | Kwon et al. | 715/850 |
| 2004/0097221 A1 | 5/2004 | Lee et al. | |
| 2004/0130614 A1 * | 7/2004 | Valliath et al. | 348/14.01 |
| 2005/0125229 A1 | 6/2005 | Kurzwell et al. | |
| 2006/0145944 A1 | 7/2006 | Tarlton et al. | |
| 2006/0147094 A1 * | 7/2006 | Yoo | 382/117 |
| 2008/0124690 A1 * | 5/2008 | Redlich | 434/236 |
| 2008/0214168 A1 | 9/2008 | Bailey et al. | |
| 2008/0215971 A1 | 9/2008 | Gillo et al. | |
| 2010/0220897 A1 * | 9/2010 | Ueno et al. | 382/115 |

OTHER PUBLICATIONS

Grillion, Helena; Thalmann, Daniel; Eye Contact as Trigger for Modification of Virtual Character Behavior, 2008, IEEE, p. 205-211.*
Badler, Norman I.; Badler, Jeremy B.; Park Lee, Sooha, Eyes Alive, 2002, University of Pennsylvania Scholarly Commons.*

* cited by examiner

*Primary Examiner* — Daniell L Negron
(74) *Attorney, Agent, or Firm* — Kenneth L. Sherman, Esq.; Michael Zarrabian, Esq.; Sherman & Zarrabian LLP

(57) ABSTRACT

An avatar image on a device display, such as a cell phone or laptop computer, maintains natural and realistic eye contact with a user (a human being) while the user is communicating with the other human being, whose avatar is displayed on the device. Thus, the user and the avatar have natural eye contact during the communication session (e.g., phone call). Modules within the device ensure that the avatar eyes do not maintain a fixed gaze or stare at the user constantly and that the avatar looks away and changes head and eye angles in a natural manner. An imager in the device captures images of the user and tracks the user's eyes. This data is inputted to an avatar display control module on the device which processes the data, factors in randomness variables, and creates control signals that are sent to the avatar image display component on the device. The control signals instruct how the avatar eyes should be positioned.

22 Claims, 5 Drawing Sheets

EYE GAZE CONTROL DURING AVATAR-BASED COMMUNICATION

BACKGROUND OF THE INVENTION

1. Field of the Invention

The present invention relates to communication devices enabling avatar-based communication. More specifically, it relates to control of an avatar image during avatar-based communication.

2. Description of the Related Art

Present avatar-based chat and messaging on devices such as cell phones and computers do not provide a satisfying human-avatar interaction. In these scenarios a user is able to see an avatar of the person the user is speaking with on the user's device. "Videophones" have been long-predicted devices that provide live video and voice in a person-to-person communication. However, although the technology is feasible, live video chat has not proven very popular, at least compared to voice-only interaction. One reason it has not become popular is that people are sometimes reluctant to display their current appearance and background location when they are in informal circumstances.

However, a user may feel comfortable being represented by a customized avatar that appears to speak in the user's voice. This concept, called "avatar chat," provides some of the benefits of video chat (an experience that comes closer to resembling face-to-face communications than voice-only chat) without requiring the user to prepare his or her appearance or to sacrifice privacy, as true video chat requires. However, with current avatar-based chat, the user's interaction with the avatar's image displayed on the user's device (e.g., handset, laptop, and the like) has not been very natural or realistic. Although the avatar's face is visible, it does not engage with the user in a human-like or natural way, which makes the interaction with the user less appealing. For example, the avatar's eyes and head angles often do not conform or adjust to the conversation and to the head and eye movement of the user, as a person's eyes and head angles would do if she were speaking with the other person face-to-face.

SUMMARY OF THE INVENTION

In one embodiment, a method of providing natural and realistic eye contact between a user (human being) of a device that may be used for communication, such as a cell phone or a laptop computer, and an avatar image displayed on the device, is described. An eye position of the user is determined using a user-facing camera in or attached to the device, thereby creating eye position data. The data is modified so that it is relative to the location of the avatar image on the device. An avatar head angle value and an avatar eye angle value are calculated to indicate the position of the user's eyes from the point of view of the avatar's image. The avatar image display may then be adjusted using the head and eye angle values, so that the avatar appears to be looking directly into the user's eyes.

In another embodiment, the eye position data is modified by transforming the data and adjusting the data to prevent constant eye contact. The eye position data may be adjusted by adding a first randomness factor to a vertical component of the eye position data and a second randomness factor to a horizontal component of the eye position data. In another embodiment, if the user eye position data does not have a depth value, an implied depth value may be inserted into the data.

Another embodiment is a device capable of avatar-based communication. The device has a user-facing imager or camera that is capable of capturing an image of the user while the user is utilizing the device for communication. It also contains an eye-tracking module for tracking the user's eyes while using the device. The eye-tracking module creates eye position data which may then be input to a translation module that translates the position data to include a depth coordinate, if one is not already present in the inputted position data. An avatar image display control module accepts as input the user eye position data and outputs control signals to the avatar image display unit so that the avatar makes natural and realistic eye contact with the user during their communication. In one embodiment, the avatar image display control module includes a head angle calculation module and an eye angle calculation module. It may also include a head and eye angle modification module and an eye-gaze adjustment module.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for enabling natural and human-like eye contact between a human user of a device and an avatar facial image displayed on the device during communication between the human user and the avatar are described in the various figures. Avatar-based chat is becoming increasingly popular on various types of communication devices, including mobile or "smart" handsets, mobile phones, laptop computers, so-called "netbook" computers, and desktop computers. For example, a handset or cell phone user is able to see an avatar image of the person she is talking to on her handset display, making the degree of communication between the user and the person with whom she is speaking closer to an actual face-to-face conversation. As is known generally, one of the advantages of having a face-to-face conversation is the ability to have eye contact with the other person. In the described embodiment, the avatar's eyes and the user's eye make normal contact when the user and the other person are talking on the cell phone or over a desktop or laptop computer. An avatar is an image, often computer generated, that a person selects to personify or represent her personality, character, and the like, and is used by the person to present herself to others in the digital communication medium.

Figure 1A:
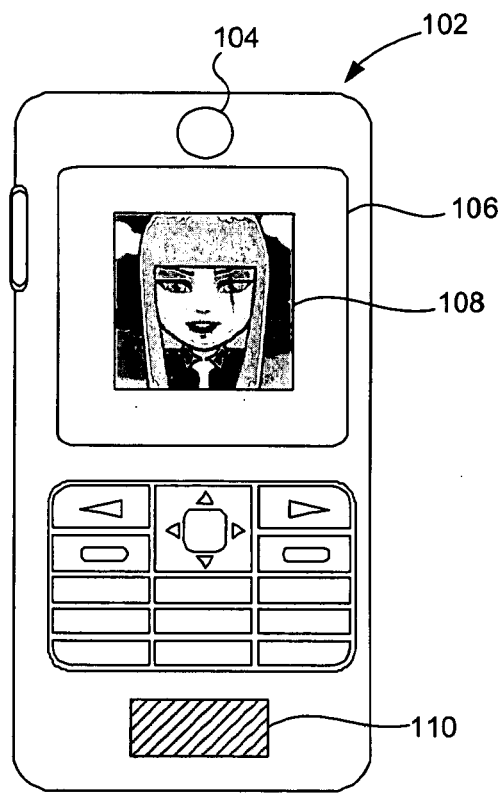
FIG. 1A is a front view of a cell phone or mobile handset device providing eye contact between an avatar and a user in accordance with one embodiment.

FIG. 1A is a front view of a cell phone or mobile handset device providing eye contact between an avatar and a user in accordance with one embodiment. A mobile handset 102 has a user-facing camera or imager 104. This imager 104 may be built into the handset or device or may be attached as a separate unit. Camera 104 is able to capture images of the user's face as the user holds the handset in front of her. A display area 106 shows an avatar image 108. As noted, avatar image 108 is intended to symbolize or represent the person at the other end of the conversation and is typically a facial image of a human or human-like figure. As described below, software for controlling the image (i.e., mostly facial expressions but possibly including other body expressions) of the avatar are on mobile handset 102, although some control software may also reside on the device that is being used by the other person. Also shown for completeness is a microphone 110 which detects audio from the user and around the user. Not shown or not labeled in FIG. 1A are other conventional features of a mobile phone, such as a keypad, speaker, buttons, and other controls for operating phone 102.

Figure 1B:
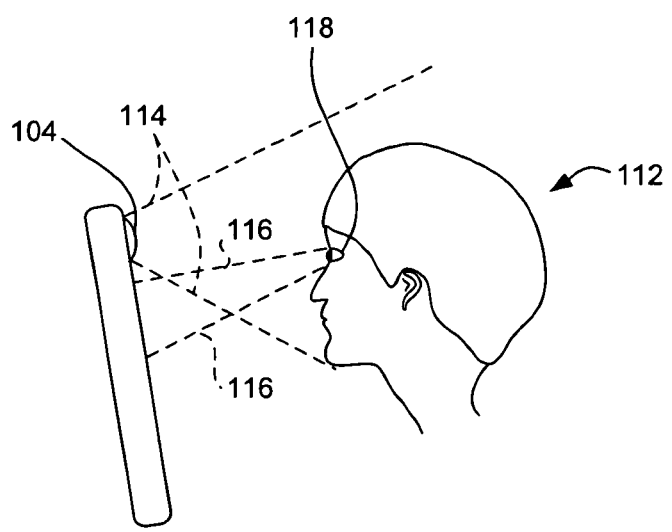
FIG. 1B is an illustration of a user holding a handset and shows the relevant field of views of the imager and of the user while looking at an avatar image.

In FIG. 1B a user 112 holds handset 102 generally in front of her, maybe at an angle where user 112 is looking somewhat down at handset 102. User 112 may use a "speaker phone" feature on handset 102 to allow the user to speak and hear the other caller without having to hold the handset up to the user's ear. As shown in FIG. 1B, the handset-to-ear position would prevent imager 104 from being able to capture images of the user's face while she is talking.

FIG. 1B is a side view of handset 102 with camera 104. A field-of-view or range of camera 104 is shown by dashed lines 114. Here it shows the range having a span that includes a large portion of the user's face. If the user moves the handset closer, a smaller portion of her face will be within range. The user's eyes 118 focus on the display area, the general area of the user's focus or attention shown approximately by two dashed lines 116. Avatar facial image 108 has eyes that make contact with user eyes 118 in a human-like manner. The focus of the avatar's eyes is on the user's eyes 118, although this focus may not be constant as described below (because human-like eye contact would normally not be a constant eye gaze). With respect to the user's focus, although it is generally on the avatar facial image, it is specifically on the avatar's eyes which, likewise, is not constant.

Similar features and concepts may be applied to different types of devices, such as laptop and desktop computers. With computers, the camera or imager is typically facing the user and the avatar image may be anywhere on the computer monitor. Conventional speakers, microphones, or headphones may be used for communication between the user and the other party or parties. Some of the notable differences is that the camera on the computer may be moved and the location of the avatar image display may be moved around on the monitor (with cell phones or handset devices, these are typically fixed). Another difference may be the distance between the user and the camera, which is typically greater with laptop/desktop computers (approximately 18" to 24") compared with the distance most users hold their handsets from their face when making a call using speakerphone (approx. 10" to 12").

Various embodiments of the present invention may be implemented on any communication device that has both a display for showing the avatar image and a user-facing camera (imager). The communication may be over telephone lines (POTS), the Internet, or over wireless cellular phone networks. For example, if a television is Internet-enabled and may be used as a communication device to make voice-over-IP calls, for example, and has a user-facing camera, speaker, microphone, and certain software, as described below, it may also be used for avatar-based chat. In this scenario, the camera and image display may not be fixed and the distance between the user and the camera may be greater than the distances noted above.

Figure 2:
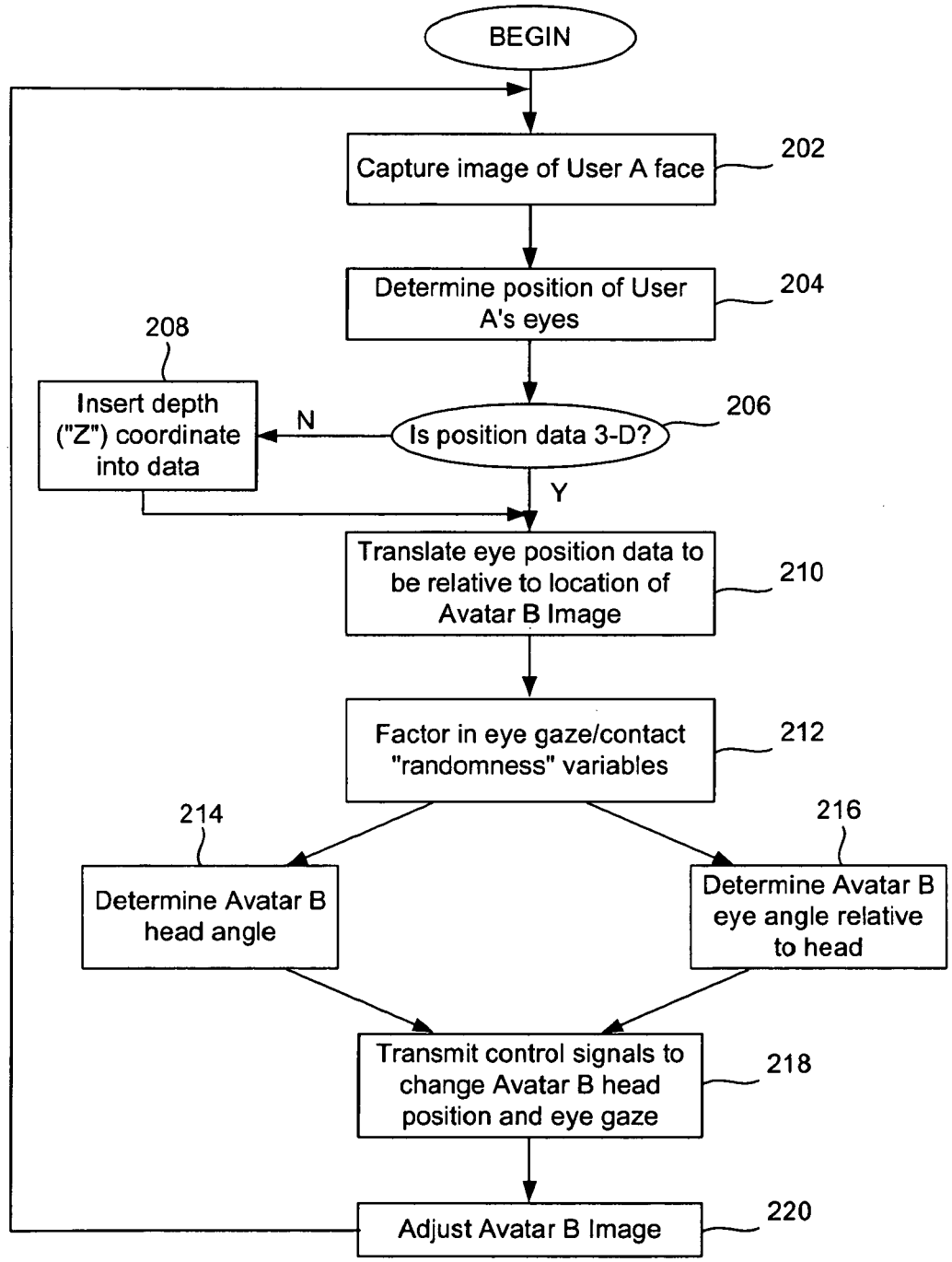
FIG. 2 is a flow diagram of a process of enabling human-avatar eye contact during avatar-based chat in accordance with one embodiment.

FIG. 2 is a flow diagram of a process of enabling human-avatar eye contact during avatar-based chat in accordance with one embodiment. A communication device has an imager or camera that generally faces the person using the device. As noted above, the device may be a cell phone, laptop or desktop computer, a conventional "land-line" phone, and the like. At step 202 the camera captures an image of the user. The image should include at least the user's face but may include more, such as neck and shoulders. The imager is positioned on or in the device in a manner that allows it to capture an image of the user while the user is using the device. In one embodiment, the imager is constantly or nearly constantly capturing images of the user's face and tracking the location of his eyes, rather than taking multiple pictures of it at discrete time intervals. At step 204 eye detection software in the device receives the captured image of the user's face and determines the location of the user's eyes. In one embodiment, the location may be a single position between the user's eyes (such as near the bridge of the nose) rather than one of the eyes or two positions for both eyes (it is assumed that both eyes move together). The coordinate system may depend on the software used to track and determine the eye position. For example, the origin, in rectilinear coordinate form, (0,0) may be the upper left corner of the captured image. Thus, the coordinate of the eye position is relative to the origin. Eye and face tracking or detection software is available from Seeing Machines, Logitech, Canon, Nikon, and other imager and camera companies.

Once the position of the user's eyes has been determined, a coordinate translation module receives the eye coordinate data and examines the data at step 206. In one embodiment, it determines whether the position data contains depth data; that is, whether the coordinate data is three-dimensional (3-D). For reasons described below, it is desirable in some embodiments to have a depth coordinate; in other words, a distance from the imager to the eyes in order to create more natural human-avatar eye contact (without a depth coordinate, the resulting eye contact may be slightly off which may still feel unnatural to the user). In another embodiment, if the eye coordinate data is two-dimensional (x,y), control goes to step 208 where an implied depth coordinate (z) is inserted by the software. The value of z may depend on the type of device or may be configured by the user. This value indicates a default approximate distance from the imager to the user's face which, as noted above, may be about 18" to 24" for laptops or desktops (assuming the image is in line with the display) or roughly 12" for cell phones. The imager software may also allow the user to enter a distance that is specific to the user. In any case, at step 208 this depth value is inserted into the coordinate data. If the coordinate data from the imager software already contains a "z" coordinate, control goes straight to step 210.

The 3-D eye position data indicates the position of the user's eyes relative to the imager or camera which captured the initial facial image. Thus, if looking at the user from the perspective of the camera, the eye position data will indicate fairly precisely where the user's eyes are from the vantage point of the camera. That is, the coordinate system used to represent eye position data is based on the location of the imager. However, what will be needed eventually is eye position data that indicates with the same precision where the user's eyes are from the vantage point of the avatar image and, more specifically, from the vantage point of the avatar's eyes (although the position of the avatar's eyes in the display may be approximated).

At step 210 the 3-D eye position data is translated so that it indicates the position of the user's eyes relative to the avatar image. The difference in angle may be slight (e.g., the avatar image may be a few inches or even less than one inch from the camera if the device is a cell phone, see FIG. 1C), but accounting for this slight difference is important in creating a natural eye-to-eye contact. In order to perform this type of translation, the translation module, described in FIG. 3, may need the position of the imager and the position of the avatar image display. In the case of cell phones, the position of the imager and avatar display may be generally fixed, at least for the imager. In the case of computers, the imager may be built in or may be moved and the location and size of the avatar image display may be at different locations on the monitor. In any case, in one embodiment, the translation module always knows the distance and direction between the imager and the avatar display.

Figure 4:
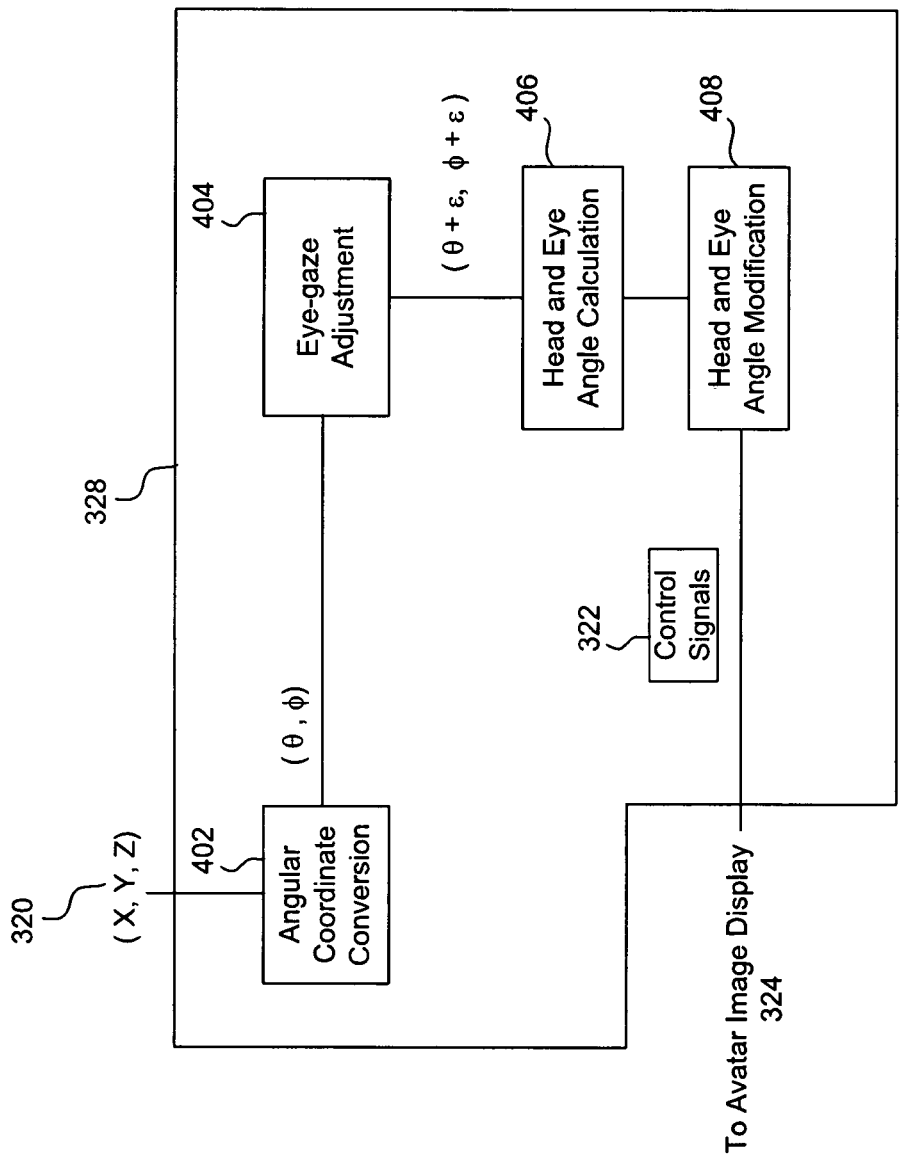
FIG. 4 is a logical block diagram showing relevant component of avatar display control module in accordance with one embodiment.

Eye position data which, in the described embodiment, is in rectilinear coordinates, (x,y,z), is translated to angular coordinates, $(\theta, \phi)$, using standard geometry. In one embodiment, $\theta$ represents the horizontal or left-right angle of the user's eyes and $\phi$ represents the vertical or up-down angle. This may be done in the translation module or in the avatar control module, as shown in FIG. 4. In another embodiment, eye position data may be provided by the eye tracking software in angular coordinates and translated (to adjust for perspective and to add implied depth data, if needed) while in angular coordinate form.

One aspect of human eye contact between two people is that eye contact is rarely constant through a conversation. There may be exceptions to this, for example, with short interactions, eye contact between two individuals may be constant, but normally one or both person's eyes wander or look away occasionally. Eye contact characteristics may also differ in various cultures. In some cases, a high degree of eye contact may not be socially acceptable or considered polite, whereas in some societies, the same degree of eye contact may be the norm or desirable. There are also nuances in eye contact based on whether a person is speaking or listening. A speaker may try to maintain eye contact while the listener may intermittently look away or vice versa. Of course, there are numerous other factors, such as the relationship between the two people, the nature and content of the conversation, among many others. These and other factors have been studied in the fields of psychology, anthropology, and other areas of human behavior.

At step 212, some of these factors are taken into consideration. In one embodiment, they are accounted for at a general level. That is, it is generally desirable to prevent constant eye contact between the user and the avatar. More specifically, in one embodiment, the avatar image does not maintain a constant eye gaze at the user. The user, being an actual human user, can avoid eye contact with the avatar naturally. However, it is assumed that most users would not want the avatar to, essentially, constantly gaze at the user during the conversation. At step 212, in one embodiment, two variables, $\epsilon_1$ and $\epsilon_2$ are added to $\theta$ and $\phi$, respectively. The values of these variables may depend on what degree of randomness the software provider (as opposed to the user) believes should be incorporated into the system. Their values may change depending on various factors noted above (e.g., based on who is talking, geographic region, etc.). Sometimes the variables will be zero. In some cases they may be zero 80% of the time and in other scenarios they may be zero 50% of the time. The variables may differ, thereby causing the avatar to avert eye gaze by moving her head up/down or left/right, or combinations of both. When they are zero, the avatar has direct eye contact with the user. Note that an avatar may avert eye contact by only moving eyes away momentarily without moving its head. Steps 214 and 216 may occur generally simultaneously. The avatar control module determines the head angle of the avatar and the eye angle of the avatar relative to the head angle. The head angle sets the direction that the avatar head is facing and the eye angle is the angle the eyes are gazing. The head angle is relative to the coordinate space around the head. The eye angle is relative to the angle of the head. If the avatar's head is facing straight, the angle of the head is zero. If the avatar's eyes are looking straight ahead, their angle is zero. If the avatar's head moves while the eyes keep looking straight ahead, the angle of the head has changed, but the angle of the eyes remains zero. If the avatar's eyes move while the head faces straight ahead, the angle of the eyes has changed, but the angle of the head remains zero. There may be limits as to how far the avatar's head (or neck) can turn. In some cases, the neck and head may be stationary and may not be able to turn, in which case eye contact is maintained only by movement of the avatar's eyes. The one or more algorithms for calculating these angles take into account another degree of freedom. As is known, when people talk, they often move their heads and eyes, and typically move their eyes more frequently than their heads, although there may be situations where the opposite is true. In one embodiment, in order to create more human-like behavior of the avatar with respect to eye and head movement, the algorithms for determining the head and eye angles factor in a randomness that implements avatar behavior that more closely mimics human-like head and eye movement behavior. For example, the eye angles may change with greater speed and frequency than the head angles, or the eye angles may change rapidly to mimic the common quick darting movement of human eyes known as "saccades"; the timing, direction and amplitude of such saccades can all be chosen randomly. In another embodiment, the variables $\epsilon_1$ and $\epsilon_2$ to prevent constant avatar eye gaze may be factored in to the head and eye angle values outputted from step 214 and 216.

At step 218 one or more control signals to change the avatar head position and eye gaze are transmitted to the avatar image display so that the graphical data representing the image is modified. The control signals may also incorporate other data relating to the avatar image that are not relevant to the present invention (e.g., changing the size, color, facial expressions, and the like). The control signals are sent from the avatar display control module and, thus, are responsible for controlling the overall display of the avatar image.

At step 220 the actual avatar image is modified or adjusted and a process of one cycle of adjusting the avatar eye gaze and head position is completed. This process is repeated with another image capture of the user's face at step 202 as indicated by the line returning to step 202. If the user's head position has changed at the next cycle, then the avatar eye and head angles will shift accordingly. Through this process, the avatar's eyes and head are positioned such that the avatar appears to be making natural human eye contact with the user during their conversation. The frequency of the image capture of the user's face at step 202 may be based on the initial configuration of the software or may be determined by the capabilities of the imager. Some sample rates may be executing a new image capture every 0.1, 1, 5, 15, or 30 seconds, or continuous capture. Of course, the more frequent the image capture, the more power that is consumed, which may be an issue with battery-operated devices.

In other embodiments there may be default head and eye movement angles so that the avatar's eyes or head is always moving to at least a small degree to maintain a more natural behavior, even if the user's head is not moving significantly. The velocity or "suddenness" at which the avatar's head moves or turns may also be controlled so that such movements do not look unnatural to the user (i.e., head movement that is too rapid or mechanical will not appear natural to the user). Variables may be added and adjustments may be made to the algorithms and translations described above to implement these features.

Figure 3:
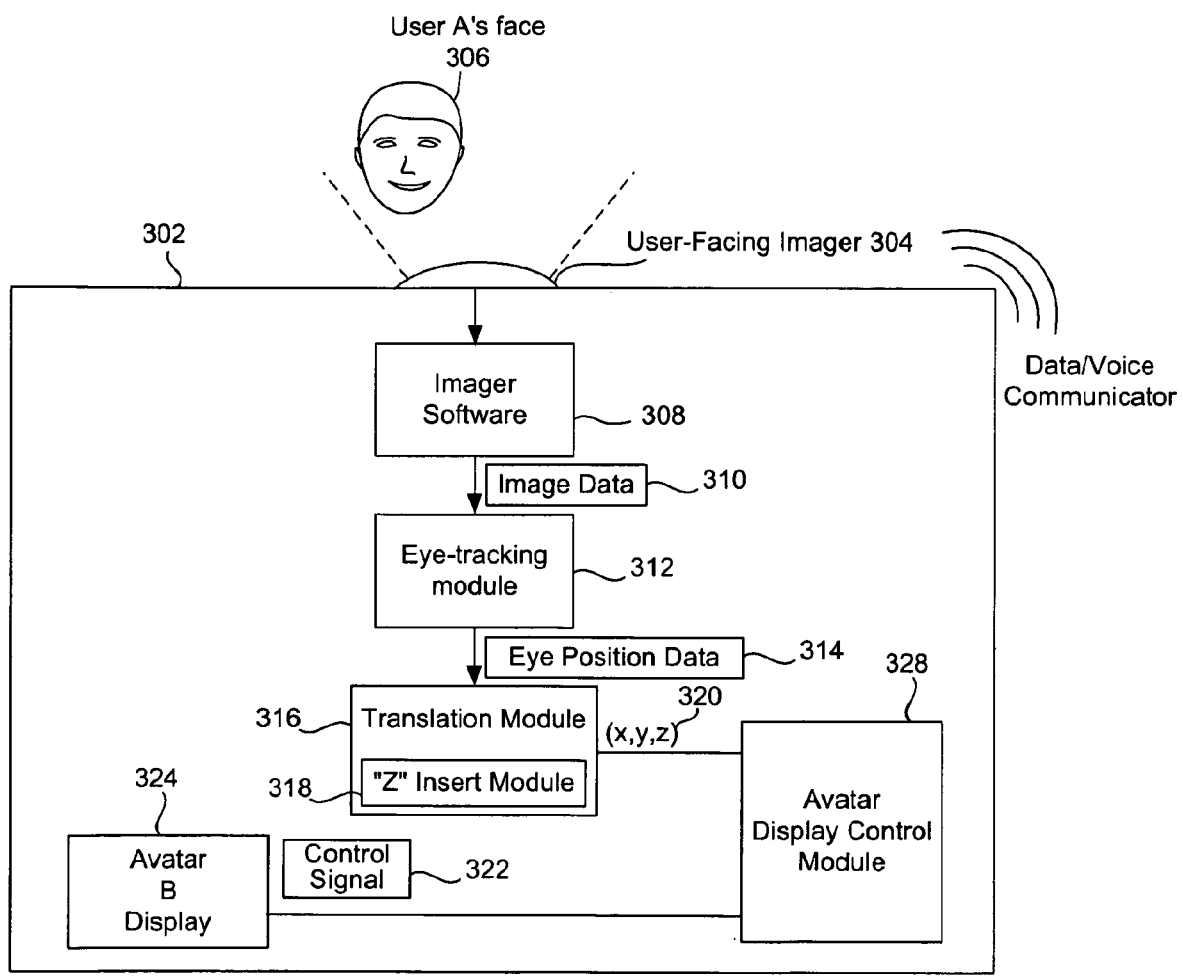
FIG. 3 is a block diagram of a communication device capable of avatar-based "chat" and providing human-like eye contact between an avatar image and a user in accordance with one embodiment.

FIG. 3 is a block diagram of a communication device capable of avatar-based "chat" and providing human-like eye contact between an avatar image and a user in accordance with one embodiment. A communication device 302 has an imager or camera 304 whose field of view includes a user 306 (only the face is shown). Communication device 302 communicates with other devices and is able to transmit voice and/or data over various types of networks noted above (e.g., cellular network, Internet, POTS, other wireless or wired networks, etc.).

Imager 304 captures an image and sends it to imager software module 308. Imagers/cameras and associated software are commercially available from various companies including Seeing Machines, Logitech, and Canon. Many cell phones and other handset communication devices have user-facing cameras and associated software pre-installed. Image data 310 is transmitted to eye-tracking module 312, which is also commercially available from various companies, including those listed above. Eye position data 314 is transmitted to a translation module 316. Module 316 adjusts eye position data to reflect the perspective of the avatar image instead of imager 304, so that position data 320 is now relative to the avatar image [I believe this should refer to the data leaving module 316, not to the data entering 316. Currently the data leaving 316 is not numbered in FIG. 3, so 320 or another label should be added]. It may also have a depth data insertion module 318 (or a "z" coordinate insertion module, if dealing with rectilinear coordinates) for inserting a depth indicator if the eye position data does not include depth information.

In other embodiments, the functionality of insertion module 318 may not be included in translation module 316 and instead may be a separate module that executes on output 320 (without the "z" coordinate) of translation module 316. Once the depth data coordinate has been inserted, the eye position data is transmitted to an avatar display control module 320, if necessary. In one embodiment, the eye position data is in rectilinear format (x,y,z) as shown in FIG. 3. Avatar display control module 328 is described in greater detail in FIG. 4. One or more control signals 322 are outputted by module 328 and transmitted to a display element 324 where the avatar image is modified. Control signal 322 may contain instructions or data for changing the avatar image in various ways and may not be limited to head and eye position.

FIG. 4 is a logical block diagram showing relevant components of avatar display control module 320 in accordance with one embodiment. The input to display control module 328 may vary. In the described embodiment, it is 3-D rectilinear coordinates (x,y,z) 320. In other embodiments, the data may be in angular coordinate format. In each case, the user eye position data has a depth component (either actual or implied) which indicates how far the user's face is from the imager. If the data is in rectilinear format, an angular coordinate conversion module 402 converts the data to two angle values, θ and φ. In other embodiments, this module may not be needed the conversion may be done by logic or computer instructions external to avatar display control module 320.

An eye-gaze adjustment module 404 accepts θ and φ as input and adds two variables, $\epsilon_1$ and $\epsilon_2$, to the angle data to create more natural interaction by preventing constant eye contact from the avatar image. This adjustment may also be done later in the process. The output from module 404 is input to an avatar head and eye angle calculation module 406 which executes one or more algorithms for determining angles of the avatar image head and eyes (with relation to the avatar's head angle) based on the user's eye location.

Numerous factors may be taken into consideration when determining the avatar head angle and eye angle. For example, some algorithms may cause the avatar head to move more than the eyes. Other algorithms may take into consideration whether the person is speaking and listening. Some of these factors may also be considered in eye-gaze adjustment module 404. In one embodiment, within module 406, two pairs of angular coordinates are calculated, one pair (θ, φ) for the avatar's head angle (up-down, left-right) and another pair (θ', φ') for the avatar's eye angle. In one embodiment they are outputted from module 406 to a head and eye angle modification module 408. In this case control signals representing the actual graphics changes being made to the avatar image are produced. These control signals are transmitted to avatar image display 324 or to a graphics control chip or component associated with the display.

Figure 5A:
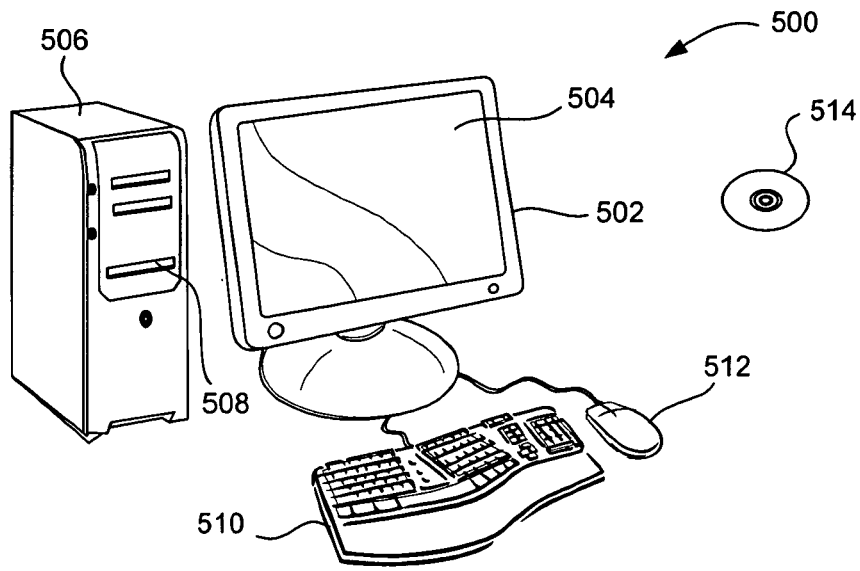
FIGS. 5A and 5B illustrate a computing system suitable for implementing embodiments of the present invention.
Figure 5B:
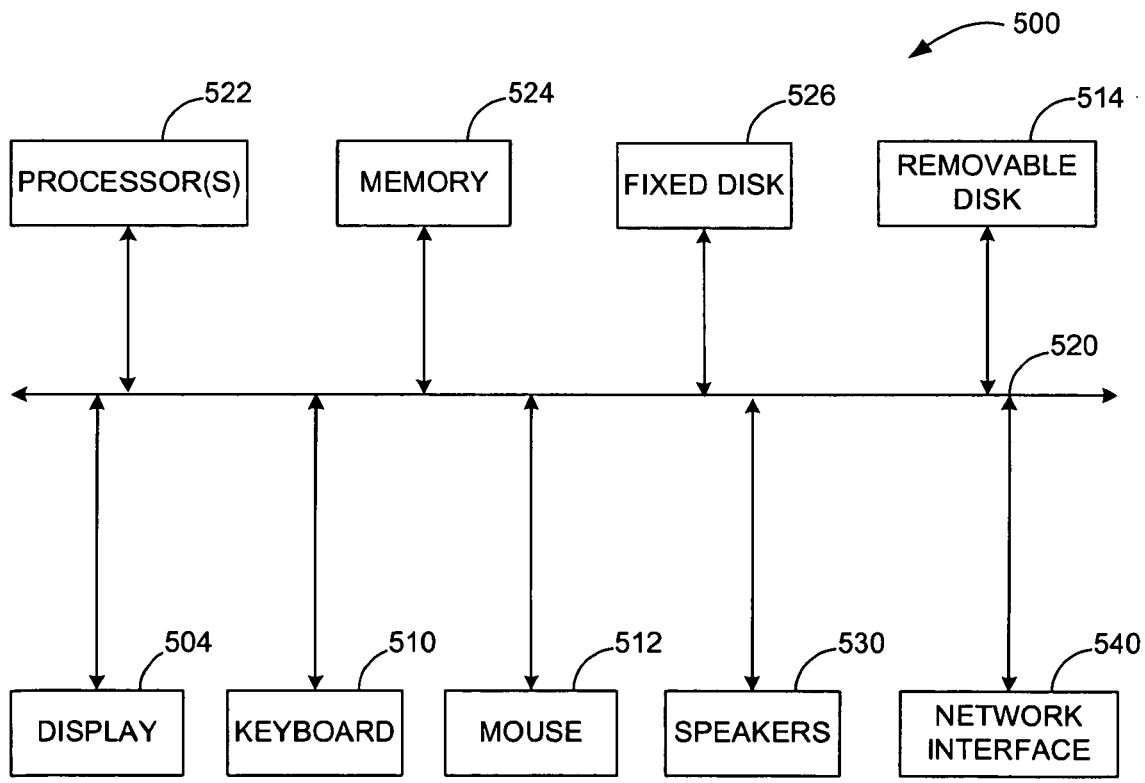

FIGS. 5A and 5B illustrate a computing system 500 suitable for implementing embodiments of the present invention. FIG. 5A shows one possible physical implementation of the computing system (a personal desktop computer). It is intended to represent a variety of computing devices that may be used to implement the various embodiments above, such as a smart handset, a cell phone, a media player capable of communication, a laptop computer or server computer, an integrated chip, a printed circuit board, or other device. Some of these devices may not have or require the various components described below or may have other components that are not described here, such as a user-facing imager and imager software. In one embodiment, computing system 500 includes a monitor 502, a display 504, a housing 506, a disk drive 508, a keyboard 510 and a mouse 512. Disk 514 is a computer-readable medium used to transfer data to and from computer system 500. Other computer-readable media may include USB memory devices and various types of memory chips, sticks, and cards.

FIG. 5B is an example of a block diagram for computing system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of creating natural eye contact between a user of a device and an avatar image displayed on the device, the method comprising:
   determining an eye position of the user, thereby creating user eye position data;
   translating the user eye position data so that the user eye position data indicates the eye position of the user from a vantage point of avatar eyes of the avatar image displayed on the device, wherein imager position data and avatar image display position data are used in said translating;
   adding a first random factor to a vertical angle component of the user eye position data and a second random factor to a horizontal angle component of the user eye position data, wherein the first random factor and the second random factor represent varying degrees of randomness incorporated into the device; and
   utilizing a randomized vertical angle component of the user eye position data and a randomized horizontal angle component of the user eye position data to adjust the avatar eyes of the avatar image displayed on the device, wherein an eye position of the avatar eyes is adjusted using only the user eye position data and is not directly randomized.

2. A method as recited in claim 1, further comprising:
   calculating an avatar head angle value.

3. A method as recited in claim 2, further comprising:
   calculating an avatar eye angle value.

4. A method as recited in claim 3, wherein the avatar eye angle value is calculated relative to an avatar head.

5. A method as recited in claim 4, further comprising:
   transmitting an avatar image display control signal based on the avatar head angle value and the avatar eye angle value.

6. A method as recited in claim 1, further comprising:
   capturing an image of the user using a user-facing camera.

7. A method as recited in claim 1, further comprising inserting an implied depth value into the user eye position data.

8. A method as recited in claim 1, further comprising:
   translating the user eye position data into angular coordinate format.

9. A method as recited in claim 1, further comprising:
   translating the user eye position data from rectilinear coordinates to angular coordinates.

10. A device capable of avatar-based communication, the device comprising:
    a user-facing imager for capturing a plurality of images of a user of the device;
    an eye-detection module for determining user eye position data;
    an eye position data translation module for translating the user eye position data so that the user eye position data indicates an eye position of the user from a vantage point of avatar eyes of an avatar image displayed on the device, wherein imager position data and avatar image display position data are used in said translating;
    an avatar eye-gazing adjustment module, wherein a first random factor is added to a vertical angle component of the user eye position data and a second random factor is added to a horizontal angle component of the user eye position data, wherein the first random factor and the second random factor represent amounts of randomness incorporated into the device, and wherein a randomized vertical angle component of the user eye position data and a randomized horizontal angle component of the user eye position data are utilized to adjust the avatar eyes of the avatar image displayed on the device, such that an eye position of the avatar eyes is adjusted using only the user eye position data and is not directly randomized;
    an avatar image display control module; and
    an avatar display component enabling display of the avatar image on the device.

11. A device as recited in claim 10, wherein the avatar image display control module further comprises:
    an avatar head angle calculation module.

12. A device as recited in claim 10, wherein the avatar image display control module further comprises:
    an avatar eye angle calculation module.

13. A device as recited in claim 10, wherein the avatar image display control module further comprises:
    an avatar head and eye angle modification module.

14. A device as recited in claim 10, further comprising:
    an imager software module.

15. A communication apparatus capable of avatar display, the apparatus comprising:
    means for determining an eye position of a user, thereby creating user eye position data;

means for translating the user eye position data so that the user eye position data indicates the eye position of the user from a vantage point of avatar eyes of an avatar image displayed on the apparatus, wherein imager position data and avatar image display position data are used in said translating;

means for adding a first random factor to a vertical angle component of the user eye position data and a second random factor to a horizontal angle component of the user eye position data, wherein the first random factor and the second random factor represent varying degrees of randomness incorporated into the apparatus;

means for utilizing a randomized vertical angle component of the user eye position data and a randomized horizontal angle component of the user eye position data to adjust the avatar eyes of the avatar image displayed on the apparatus, wherein an eye position of the avatar eyes is adjusted using only the user eye position data and is not directly randomized; and means for adjusting the avatar image displayed on the apparatus using the user eye position data.

16. A communication apparatus as recited in claim 15, further comprising:

means for calculating an avatar head angle value.

17. A communication apparatus as recited in claim 15, further comprising:

means for calculating an avatar eye angle value.

18. A communication apparatus as recited in claim 15, further comprising:

means for adjusting the eye position data to prevent constant eye contact.

19. A communication apparatus as recited in claim 18, further comprising:

means for adding a first random factor to a vertical component of the eye position data and a second random factor to a horizontal component of the eye position data.

20. A communication apparatus as recited in claim 15, further comprising:

means for inserting an implied depth value into the eye position data.

21. A method of creating natural eye contact between a user of a device and an avatar image displayed on the device, the method comprising:

determining an eye position of the user, thereby creating user eye position data;

translating the user eye position data so that the user eye position data indicates the eye position of the user from a vantage point of avatar eyes of the avatar image displayed on the device, wherein imager position data and avatar image display position data are used in said translating;

calculating an avatar head angle value;

calculating an avatar eye angle value;

combining the head angle value and the eye angle value;

adding a first random factor to a vertical angle component of the eye position data and a second random factor to a horizontal angle component of the eye position data, wherein the first random factor and the second random factor represent varying degrees of randomness incorporated into the apparatus;

utilizing a randomized vertical angle component of the user eye position data and a randomized horizontal angle component of the user eye position data to adjust the avatar eyes of the avatar image displayed on the device, wherein an eye position of the avatar eyes is adjusted using only the user eye position data and is not directly randomized; and adjusting the avatar image displayed on the device using the combined head angle value and eye angle value.

22. A device capable of avatar-based communication, the device comprising:

a user-facing imager for capturing a plurality of images of a user of the device for determining user eye position data;

an eye position data translation module for translating the user eye position data so that the user eye position data indicates an eye position of the user from a vantage point of avatar eyes of an avatar image displayed on the device, wherein imager position data and avatar image display position data are used in said translating;

an avatar eye-gazing adjustment module, wherein a first random factor is added to a vertical angle component of the eye position data and a second random factor is added to a horizontal angle component of the eye position data, wherein the first random factor and the second random factor represent amounts of randomness incorporated into the device, wherein a randomized vertical angle component of the user eye position data and a randomized horizontal angle component of the user eye position data are utilized to adjust the avatar eyes of the avatar image displayed on the device, and wherein an eye position of the avatar image is adjusted using only the user eye position data and is not directly randomized;

an avatar image display control module; and an avatar display component enabling display of the avatar image on the device.

* * * * *